(12) United States Patent
Gmeiner

(10) Patent No.: US 7,770,045 B2
(45) Date of Patent: Aug. 3, 2010

(54) METHOD AND APPARATUS FOR OPERATING COOPERATING, DIFFERING DEVICES

(75) Inventor: Peter Gmeiner, Möttingen (DE)

(73) Assignee: KUKA Roboter GmbH, Augsburg (DE)

( * ) Notice: Subject to any disclaimer, the term of this patent is extended or adjusted under 35 U.S.C. 154(b) by 1062 days.

(21) Appl. No.: 10/596,120

(22) PCT Filed: Dec. 4, 2004

(86) PCT No.: PCT/EP2004/013807

§ 371 (c)(1),
(2), (4) Date: May 31, 2006

(87) PCT Pub. No.: WO2005/059664

PCT Pub. Date: Jun. 30, 2005

(65) Prior Publication Data

US 2009/0150705 A1    Jun. 11, 2009

(30) Foreign Application Priority Data

Dec. 9, 2003    (DE) .................................. 103 57 824

(51) Int. Cl.
*G06F 19/00* (2006.01)
(52) U.S. Cl. .................... 713/400; 713/375; 713/401
(58) Field of Classification Search ................ 713/400, 713/401, 375
See application file for complete search history.

(56) References Cited

U.S. PATENT DOCUMENTS

| | | | | |
|---|---|---|---|---|
| 5,859,515 A | * | 1/1999 | Takizawa et al. ............ | 318/560 |
| 6,625,498 B1 | * | 9/2003 | Kurakake et al. ............... | 700/3 |
| 6,829,518 B2 | * | 12/2004 | Ogawa et al. ................ | 700/174 |
| 6,885,909 B2 | * | 4/2005 | Isohata ........................ | 700/193 |
| 6,888,334 B2 | * | 5/2005 | Fujibayashi et al. .......... | 318/625 |
| 6,925,349 B2 | * | 8/2005 | Albrecht et al. .............. | 700/128 |
| 7,026,784 B2 | * | 4/2006 | Shimizu et al. ......... | 318/400.26 |
| 7,119,514 B2 | * | 10/2006 | Shimizu et al. ......... | 318/400.13 |

FOREIGN PATENT DOCUMENTS

| | | |
|---|---|---|
| CN | 1429468 | 7/2003 |
| DE | 19723956 | 12/1998 |
| DE | 10065419 | 7/2002 |
| EP | 0431180 | 6/1991 |
| EP | 0507955 | 10/1992 |
| EP | 1052560 | 11/2000 |
| WO | WO01/58191 | 8/2001 |

* cited by examiner

*Primary Examiner*—Abdelmoniem Elamin
(74) *Attorney, Agent, or Firm*—McGlew and Tuttle, P.C.

(57) ABSTRACT

A method for operating cooperating, differing devices, particularly of a plant, with different controls controlling the control sequences and in particular with different control cycles, is characterized in that the clocks ($IPO_i$) of the different controls (3.1, 3.2, 3.3) are interpolated on a common system clock ($t_{Tick}$) and that the control sequences are synchronized. An apparatus suitable for performing the inventive method correspondingly has at least one common interpolating device (5.3) for the controls (3.1, 3.2, 3.3) for interpolating the cycles ($IPO_i$) of the different controls (3.1, 3.2, 3.3) on a common system clock ($t_{Tick}$) and at least one synchronizing device (5) for synchronizing the control sequences.

18 Claims, 4 Drawing Sheets

METHOD AND APPARATUS FOR OPERATING COOPERATING, DIFFERING DEVICES

FIELD OF THE INVENTION

The invention relates to a method and to an apparatus for operating cooperating, differing devices with different controls controlling the same by control sequences and in particular with different control clocks or cycles.

BACKGROUND OF THE INVENTION

Complex plants, which comprise a plurality of cooperating, differing devices, are nowadays preferably controlled using PC-based control solutions with respect to a control of movements (hereinafter also referred to as motion world). The devices of such a plant which are to be jointly controlled can e.g. be CNC systems (CNC: Computer Numeric Control), RC systems (RC: Robot Controller) and/or PLC systems (PLC: Programmable Logic Control; as well as SPC: Stored Programmable Control), PLC and Soft PLC systems being treated in the same way (Soft PLC/Soft SPC: software-constructed PLC/SPC).

In complex plant concepts, such as e.g. in laser plant technology, it is necessary to have numerous coordination possibilities between robots, clamping and holding devices, laser and bar controls. Thus, e.g. the geometry stations of leading car manufacturers are coordinated by means of an internal protocol of an ASCII interface using external personal computers (PC), in order to obtain an identical time behavior or response of the robot world (RC core), CNC clamping technology and laser technology. It is necessary for the individual time responses of the different motion worlds (RC, CNC, PLC) to be sent in a specially defined ASCII data file via a suitable protocol, such as TCP/IP, to a coordination PC, which corrects the said three motion worlds with regards to their time response or behavior and by means of the ASCII file sends same back to the different controls. The structure and sequence of such control methods and apparatuses are complex and correspondingly inflexible.

It is known to provide a plurality of instances (CPUs), whereof one is a centralized instance and the other decentralized instances. Each instance has its own clock generation unit. The units of the decentralized instances are synchronized by a synchronization clock of the centralized instance, i.e. the decentralized instances cannot independently generate their operational sequences corresponding to an autonomous clock, but the given clock of a decentralized instance is determined by the synchronization emanating from the centralized instance and the timing of each decentralized instance is controlled by the synchronization clock of the centralized instance. Thus, the processing clock of the individual control devices is directly synchronized and determined by the synchronizing signal of the centralized unit, so that the former can no longer operate with independent timing.

The problem of the invention is to avoid the aforementioned disadvantages by proposing a simplified, more flexible coordination and motion planning, particularly in the case of complex plants of the aforementioned type.

SUMMARY OF THE INVENTION

In the case of a method of the aforementioned type, this problem is solved in that the clocks or cycles of the different controls are interpolated on a common system clock or cycle and that the control sequences are synchronized in at least one synchronizing device. Correspondingly an apparatus of the aforementioned type solves the set problem by having at least one common interpolating device for the controls for interpolating the clocks of the different controls on a common system clock and at least one synchronizing device for synchronizing the control sequences.

The feature of interpolating the clocks of the output controls on a common system clock implies that the instructions calculated in their timing by the individual output controls are determined at the intermediate cycle times given by the higher system clock, i.e. are interpolated upwards. The instructions or values, such as controllable position values, are consequently calculated at the intermediate cycle times of the motion manager and are therefore interpolated thereto and then, building up on this, synchronization takes place. With the cycle of the individual operational units, the instructions are transferred thereto for instruction implementation.

In this way, according to the invention, there is a simple operability of more complex plants, such as in the aforementioned laser technology, where robot movements must be coordinated as a unit with PLC movements (e.g. a bar control) and clamping procedures. The coordinating device provided according to the invention coordinates the interplay of the individual axes and axis groups. The latter is understood to mean a grouping of those axes, which are driven by means of a common driver, such as a DPRAM interface (DPRAM: Dual Port Random Access Memory), so that all the drives in an axis group have the same configuration with respect to the clock frequency and protocol.

In a further development of the method according to the invention, functional units of the devices, following synchronization after a further interpolation, are supplied with control signals. It is consequently possible to operate specific devices of the plant with different clocks, if this should prove necessary for precision and/or control reasons. In a further development of the inventive apparatus, the latter consequently has at least one further interpolating device for interpolating control signals for operational units of the devices after synchronization has taken place.

According to the invention, axes of the devices can be coordinated. Thus, a preferred development of the inventive apparatus has a coordinating device for coordinating the control sequences. In order to permit a real time control of the plant or devices, the coordination and/or synchronization is performed in real time. Therefore, appropriately, the synchronizing and/or coordinating device is constructed in real timable manner. In addition, for operating and configuration purposes, it is possible to provide a non-real timable component for modifying the settings of the synchronizing and/or coordinating device.

Since via its interpolators a robot control (RC) must transmit far more coordinate-related and robot-specific informations to the coordinating device than via a simpler Soft PLC or its interpolator, within the scope of a highly preferred development of the inventive method, the different control clocks $IPO_i$ of the different controls are chosen according to a relationship $$IPO_i = n_i \cdot t_{Tick}, \; n_i = 1, 2, 3, \ldots$$

in which $t_{Tick}$ is an integral multiple of a clock of hardware used for performing the method. Such a method allows different control algorithms for the different applications, such as robot control, Soft PLC (packaging industry or plant technology) or CNC applications. The interpolation according to the invention takes place on a common system clock, preferably in a common interpolating device for all the controls. Within the scope of a highly preferred development of the inventive apparatus, the common interpolating device is constructed for interpolating control cycles in the form $IPO_i=n_i \cdot t_{Tick}$ with $n_i=1, 2, 3, \ldots$, $t_{Tick}$ being an integral multiple of a clock of hardware used.

In a preferred development of the method according to the invention, through the operational units a modified system cycle is proposed for the coordinating device. It is possible in this way to perform specific control processes, such as a current control, which require a shorter clock cycle due to the necessary precision or the like. Appropriately the coordinating device can refuse or accept the proposed, modified system clock. The latter case will in particular occur if it is possible to load the overall system through the new system clock. The higher the clock frequency, the more frequently it is necessary to calculate the control loops in the real time operating system. In a further development a plurality of operational units, following a clock change, can be operated further in accordance with the old system clock. To allow this, appropriately the following applies to the modified system clock:

$$t_{Tick}'=1/n' \cdot t_{Tick}, n'=1, 2, 3, \ldots$$

Correspondingly, according to the invention, the synchronizing and/or coordinating device is preferably constructed for modifying the system clock and for the modified system clock $t_{Tick}'=1/n' \cdot t_{Tick}$ applies, so that a shorter clock signal can be used when requested by at least one operational unit. In this connection the synchronizing and/or coordinating device, in a further development of the inventive apparatus, has an evaluating device for evaluating loading of the system and whose results are decisive for the modifications to the system clock. Thus, according to the invention, only those clock settings are allowed for the overall system which can in fact be coped with by it and in particular its real timable components.

By means of the inventive method, preferably in each case a plurality of devices of a specific type can be operated.

Within the scope of a simple, flexible development and usability of the inventive apparatus, at least the synchronizing and/or coordinating device and a plurality of controls can be constructed as programming devices implementable on a common computer unit. It can in particular be provided that in order to improve the adaptability of a plant, further devices can be connected during operation.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
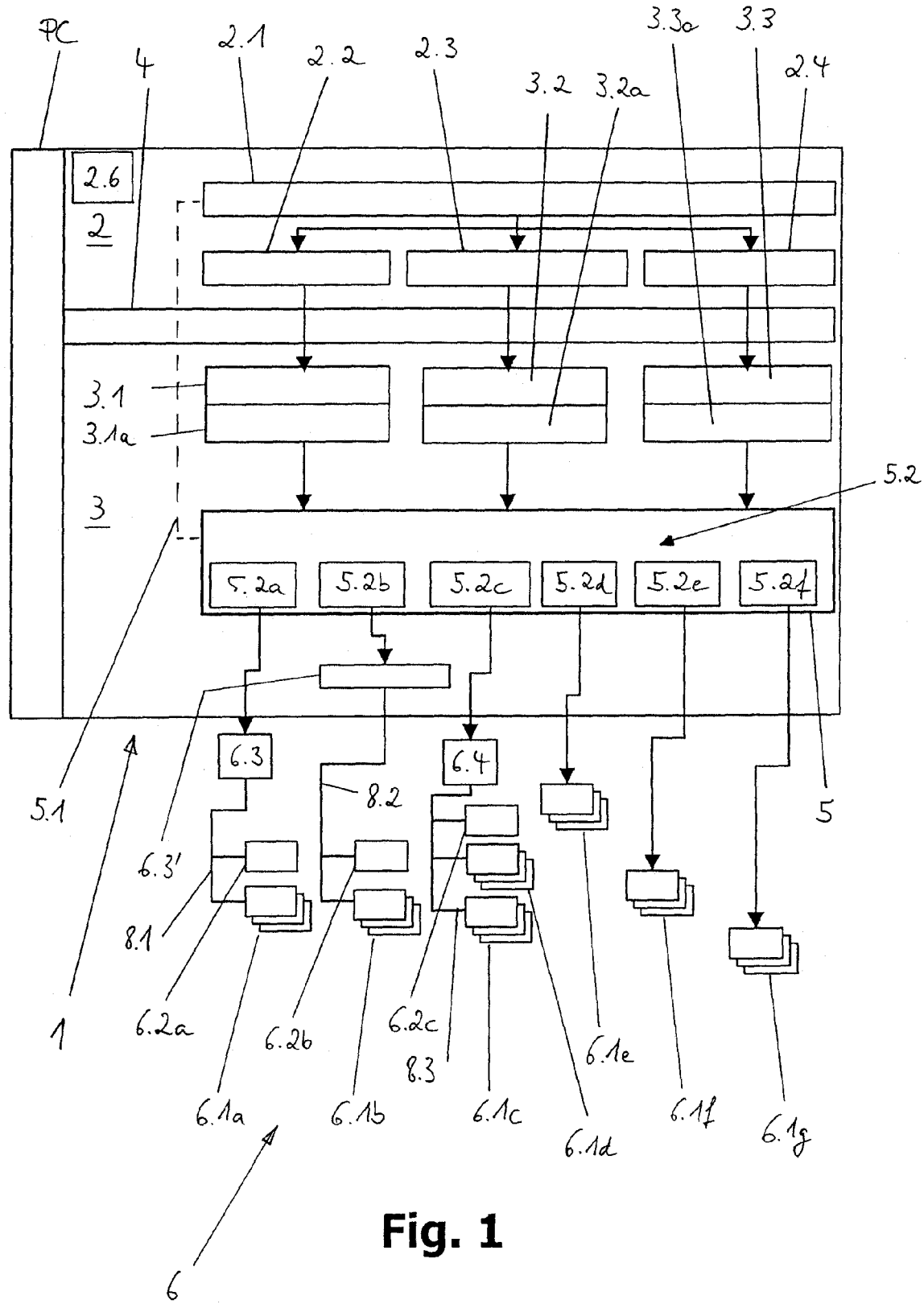
FIG. 1 is a diagrammatic overall view of an apparatus according to the invention.

Referring to the drawings in particular, FIG. 1 shows the overall architecture of a multifunctional PC control apparatus 1 for complex plants having a plurality of cooperating, differing devices, such as industrial robots, clamping devices, laser cutting tools, a conveyor line or the like (not shown here). Data transmissions during control sequences are illustrated by double arrows, as in the case of FIG. 2 and FIG. 3.

The overall inventive apparatus 1 is in the form of a personal computer PC, set up in an appropriate programming manner and as symbolized by the vertical bars to the left. For operational purposes, the PC has a non-real timable operating system 2, such as Windows, and for control purposes a real timable operating system 3, such as VxWorks. A communication between the non-real timable operating system 2 and the real timable operating system 3 is ensured by means of a suitable protocol, such as a TCP/IP protocol 4.

On the plane of the non-real timable operating system 2, the PC control is constructed for implementing programming set up operating programs, such as development and diagnostic tools 2.1. The latter can e.g. be programming tools, with which and as illustrated by the vertical arrows in FIG. 1 action can take place on a human-machine interface 2.2 (Human Machine Interface HMI), a SPC code 2.3, i.e. a control program for an optionally software constructed PLC and a G code 2.4, i.e. a CNC control program. It also has an evaluating device 2.6 for evaluating a utilization of its computer capacities.

In the real timable part 3 of the inventive apparatus 1, according to the development of FIG. 1, it has a robot control RC 3.1, a stored programmable control PLC, SPC 3.2 with so-called MCF blocks (Motion Control Function blocks) and a CNC device 3.3 (Computer Numeric Control). From the software standpoint, the latter are constructed as programs running on the PC and containing in each case an interpolating device 3.1a, 3.2a, 3.3a and according to whose predetermined timing the given control 3.1, 3.2, 3.3 runs the motion program 2.2, 2.3, 2.4 specifically suitable for it.

For the further processing of the interpolation data supplied by the interpolating device 3.1a, 3.2a, 3.3a, the inventive apparatus 1 has in its real time area 3 a program or programming device 5, referred to as a motion manager. The motion manager 5 has a non-real timable configuration device, which in the development of FIG. 1, is not expressly shown, but represented by means of a broken line connection 5.1 from the motion manager 5 to the aforementioned operating device 2.1 located on the non-real time plane 2 of the PC. The motion manager 5 is the centralized component of the inventive apparatus 1 and is described in greater detail hereinafter relative to FIG. 2 and FIG. 3.

The motion manager 5 also has a motion driver layer 5.2, e.g. a DPRAM interface, with drivers 5.2a-5.2f for information transmission to operational units 6 of the plant, such as drives 6.1a-6.1g, power supplies 6.2a-6.2c or the like. The drivers 5.2a-5.2f can be DPRAM drivers, Ethernet drivers, PowerLink drivers, Sercos drivers, Ethercat drivers or the like. Information transmission to the plant functional units 6 takes place by means of a plurality of (driving) buses 8.1, 8.2, 8.3. The latter incorporate additional elements, such as digital signal transmission elements (DSE: Digital Signal Electronic) 6.3 or further real time elements (HRB: Hard Realtime Boards) 6.4. These further elements 6.3, 6.4 need not be in the driving bus in the form of independent hardware components, but can also be present as programming devices within the PC control, as is shown by a further DSE 6.3'.

Figure 2:
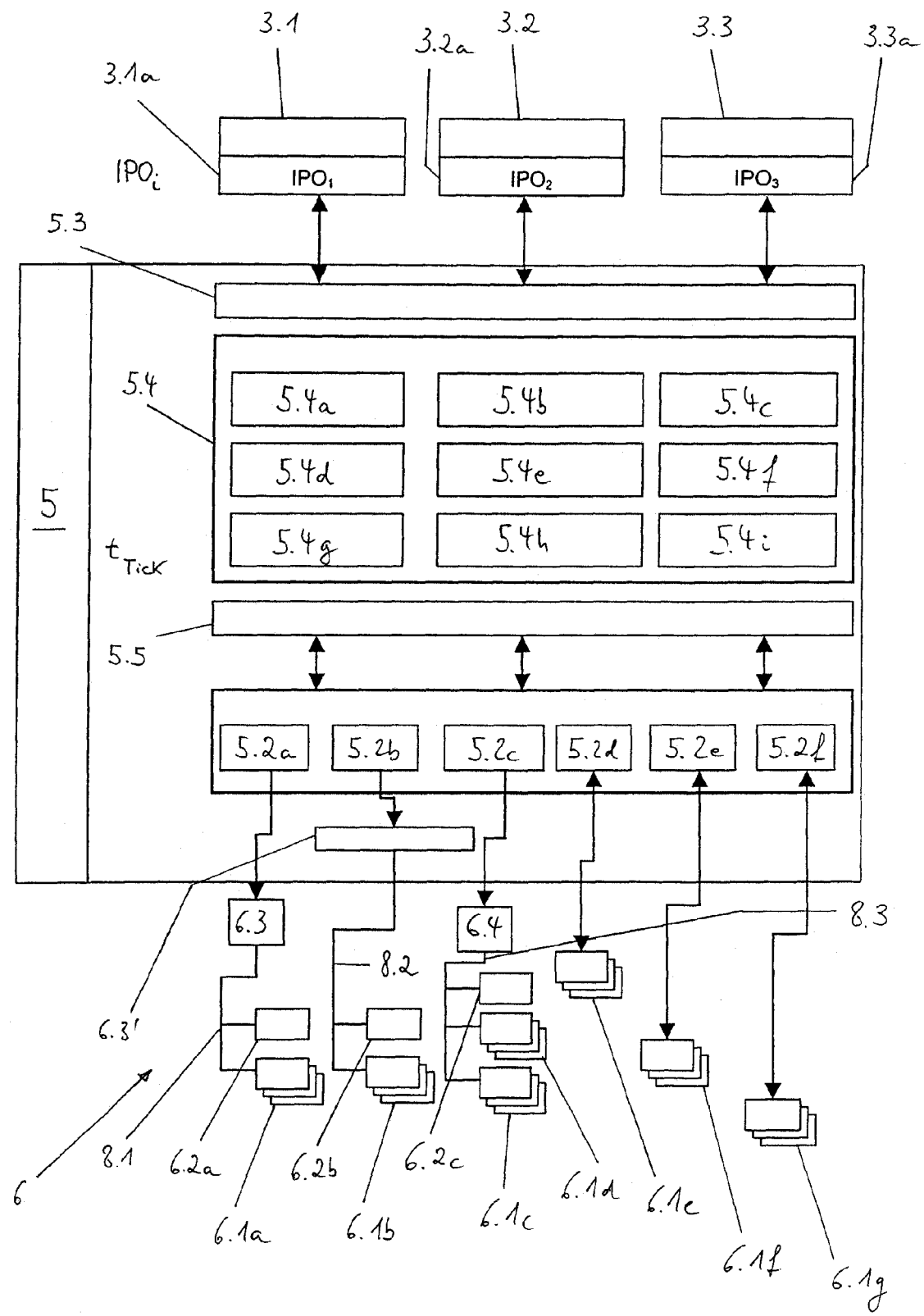
FIG. 2 is a more detailed view of in particular a real timable component of the inventive apparatus according to FIG. 1.

According to the invention, the motion manager 5 serves to interconnect the different controls and drives and to coordinate and synchronize their motions and consequently functions within the scope of the present invention as a synchronizing and coordinating device. For a coordinated sequence it is necessary that the interpolation clocks $IPO_i$ coming from the controls 3.1, 3.2, 3.3 are transferred into a system clock of the motion manager 5 and via a further intermediate interpolation supply the driving buses in the correct cycle with the informations for the drives 6.1*a-g*. FIG. 2 shows the necessary specific development of the motion manager 5.

FIG. 2 shows in detail the structure of a motion manager 5 according to FIG. 1. At the top of FIG. 2 it is once again possible to see the machine controls already shown in FIG. 1, namely the robot control 2.2, the stored programmable control (SPC/PLC) 2.3 and the CNC control 2.4. Each of these controls supplies data at its own interpolation cycle $IPO_i$, here specifically the interpolation cycles or clocks $IPO_1$, $IPO_2$, $IPO_3$, the motion manager 5 firstly has a common interpolating device for the IPO cycles $IPO_i$ referred to as the upper intermediate interpolation layer 5.3 and in which the cycles of the different controls 2.2-2.4 are interpolated to a common system cycle or clock $t_{Tick}$. For the interpolators 3.1, 3.2*a*, 3.3*a* above the motion manager 5 the following applies: $IPO_i = n_i \cdot t_{Tick}$ with $n_i = 1, 2, 3, \ldots$, i.e. said interpolators run with a higher, multiple unit of time relative to the system clock $t_{Tick}$ of the motion manager 5. For the system clock $t_{Tick}$ of the motion manager 5 the following applies: $t_{Tick} = n$ RTACC, the latter indicating a quartz cycle of the system clock, which nowadays is generally 1.25 ms for a 8 kHz quartz, and once again n=1, 2, 3, .... The specific value for RTACC is directly predetermined by the hardware used.

The upper intermediate interpolation layer 5.3 is followed by the actual core 5.4 of the motion manager 5, which is constructed for performing specific tasks, such as state management, cyclic monitoring, measuring, diagnosis, initializing, parameterization, movement, management of tasks and cycles, as well as the management of a configuration data bank (reference numeral 5.4*a-i*). The motion manager 5 also has an interpolating device referred to as the lower intermediate interpolation layer 5.5 and this is constructed for modifying time-relevant tasks in accordance with specific time scheduling tables. The time scheduling tables are required in order to extend over several time disks higher priority tasks requiring longer calculations than made available by the time disk, e.g. a clock period. Lower priority tasks are interrupted or shifted in order to completely process the higher priority tasks. These time scheduling mechanisms must be configured in such a way that the real timable run-time system runs reliably and the control mechanisms can always operate in a priority-controlled manner. No part is to be played by the particular cycle (according to the invention a multiple of the system cycle) a specific interpolator is running.

The configuration device 2.1 of FIG. 1 (with the connection 5.1, see above) proposes an interpolation cycle for each axis-relevant interpolator contained in the lower intermediate interpolation layer 5.5. The axis-relevant interpolators are not expressly shown in FIG. 2. They are interpolating devices in the lower intermediate interpolation layer 5.5, which in planned manner supply informations at specific adapted cycles to specific operational units 6, such as e.g. a drive (cf. FIG. 1). The lower intermediate interpolation layer 5.5 is followed by the DPRAM drive interface 5.2, already described relative to FIG. 1, with the corresponding drivers 5.2*a-f* for the plant buses 8.1-8.3, as has already been described in detail relative to FIG. 1.

According to the invention, the setting of the IPO clock for the particular axis-relevant interpolator and for the intermediate interpolation necessary for this in the lower intermediate interpolation layer 5.5 can be implemented either manually or automatically. It is also possible for one of the driving buses 8.1-8.3 or the corresponding functional units to propose a shorter system clock time tick to the motion manager 5. This is the case if the described PC control using a specific drive is intended to run specific control methods, such as a PC current control. If the driving bus provides a shorter clock signal than the system clock $t_{Tick}$, then the corresponding drive axis "reports" to configurator 2.1, 5.1 (cf. FIG. 1) of motion manager 5 with the inquiry for taking over the shorter system clock, referred to hereinafter as $t_{Tick}'$. By means of the evaluating device 2.6 (FIG. 1), the configurator can then determine a loading of the overall system and correspondingly propose a new system clock $t_{Tick}'$, but for which $t_{Tick}' = 1/n' \cdot t_{Tick}$ applies. Some interpolators can continue to operate with the previous IPO clock $t_{Tick}$ with the aid of the intermediate interpolation layer 5.5 if there is no need for an improved control loop. In this way it is possible in individual cases to release CPU resources for the necessarily shorter timed control loops. The indicated settings for the interpolators based on $n \cdot t_{Tick}$ or $1/n' \cdot t_{Tick}$ are consequently necessary, because within the scope of an effective implementation of the invention only a single intermediate interpolator layer 5.3, 5.5 is appropriate and all existing interpolators make use thereof. It is possible to run the different interpolators of the different devices present simultaneously, but with different cycles, because a RC interpolator must transmit much more cartesian and robot-specific information per time unit than e.g. the interpolator of a simpler Soft SPC.

Figure 3A:
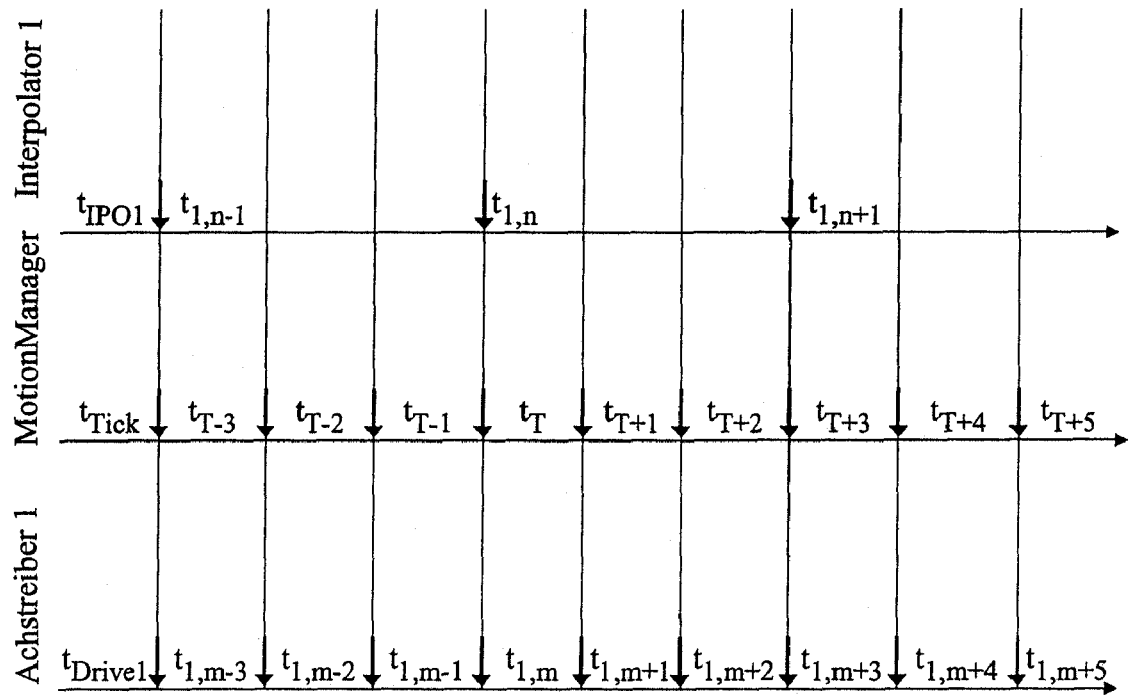
FIG. 3a and FIG. 3b are an illustration of the inventive intermediate interpolation method or the operation of interpolating devices of the motion manager.
Figure 3B:
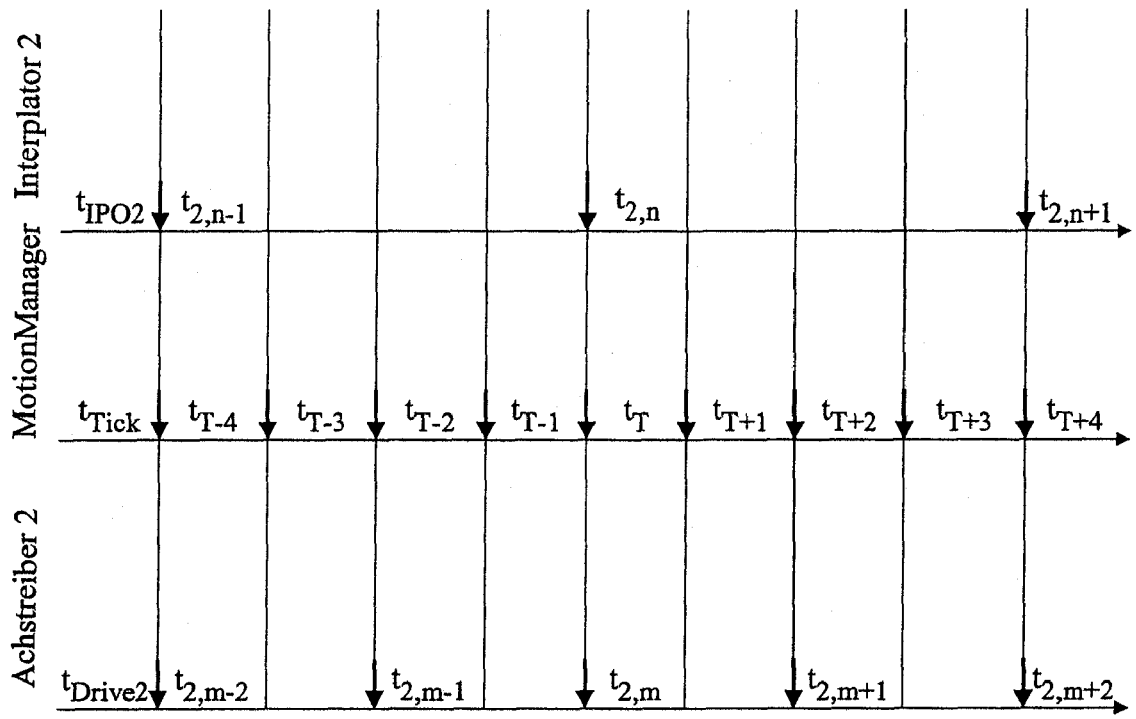

FIG. 3*a* and FIG. 3*b* show in exemplified manner the inventive intermediate interpolation method or the function of the intermediate interpolation layers 5.3 of motion manager 5 of FIG. 2.

FIG. 3*a* initially shows the IPO clock $t_{IPO1}$ of interpolator 1, which corresponds to interpolator 3.1*a* of control 3.1, whereas FIG. 3*b* shows the IPO clock $t_{IPO2}$ of an interpolator 2, which corresponds to interpolator 3.2*a* of control 3.2.

In the center of both FIG. 3*a* and FIG. 3*b* is shown the clock $t_{Tick}$ of the motion manager, which coincides in the case of FIG. 3*a* and FIG. 3*b*. The clock of the motion manager $t_{Tick}$ is in each case a multiple of the interpolator clocks $t_{IPO}$ and namely in the specific embodiments three times the clock $t_{IPO1}$ of interpolator 1 and four times the clock $t_{IPO2}$ of interpolator 2. In each case last line of FIG. 3*a* is shown the clock of the axis drivers 1 and 2, axis driver 1 of FIG. 3*a* possibly corresponding to axis driver 5.2*a* of FIG. 1 and FIG. 2 and axis driver 2 of FIG. 3*b* to axis driver 5.2*c* of FIG. 1 and FIG. 2.

In FIG. 3*a* the driver clock $t_{Drive1}$ of axis driver 1 corresponds to the motion manager clock $t_{Tick}$, whereas in FIG. 3*b* the driver clock $t_{Drive2}$ of axis driver 2 is half as large as the motion manager clock $t_{Tick}$ (i.e. the intervals between clock signals are twice as long).

The method according to the invention is as follows: interpolator 1 transfers to the motion manager instructions or values calculated in its clock $t_{IPO1}$ and said manager takes over the values or instructions transferred by interpolator 1 at $t_{Tick}$ times ..., $t_{T-3i}$, ..., $t_{T-3}$, $t_T$, $t_{T+3}$, ..., $t_{T+3i}$, ..., in which i=1, 2, 3 ..., whereas at the intermediate times ..., $t_{T-3n-2}$, ... $t_{T-2}$, $t_{T-1}$, $t_{T+2}$, $t_{T+4}$, $t_{T+5}$, ..., $t_{T+3n+1}$, $t_{T+3n+2}$, ..., relative to the IPO clock $t_{IPO1}$ of interpolator 1 then carries out an interpolation of the transferred values or instructions, i.e. recalculates them for the indicated clock times and, in the development of FIG. 3a with its clock, i.e. also at its clock times and with the identical clock of the $t_{Drive1}$ of the axis driver 1 and therefore transfers the identical clock times to the axis driver 1, which controls the corresponding operational unit therewith (FIG. 1 and FIG. 2).

The same applies for the control instructions or values delivered by interpolator 2, but here the motion manager does not transfer them with its cycle $t_{Tick}$ (in that it interpolates and therefore recalculates them), but instead does so with half the cycle or clock corresponding to the clock $t_{Drive2}$ of axis driver 2 and therefore e.g. at times $t_{T-4}=t_{2,m-2}$, $t_{T-2}=t_{2,m-1}$, $t_T=t_{2,m}$, $t+2=t_{2,m+1}$, $t_{T+4}=t_{2,m+2}$, ....

The multiplication of the interpolator clock to the motion manager clock and also the division of the axis driver clock can be of a random nature, the motion manager clock $t_{Tick}$ being the highest clock and a multiple of all other clocks.

Figure 4:
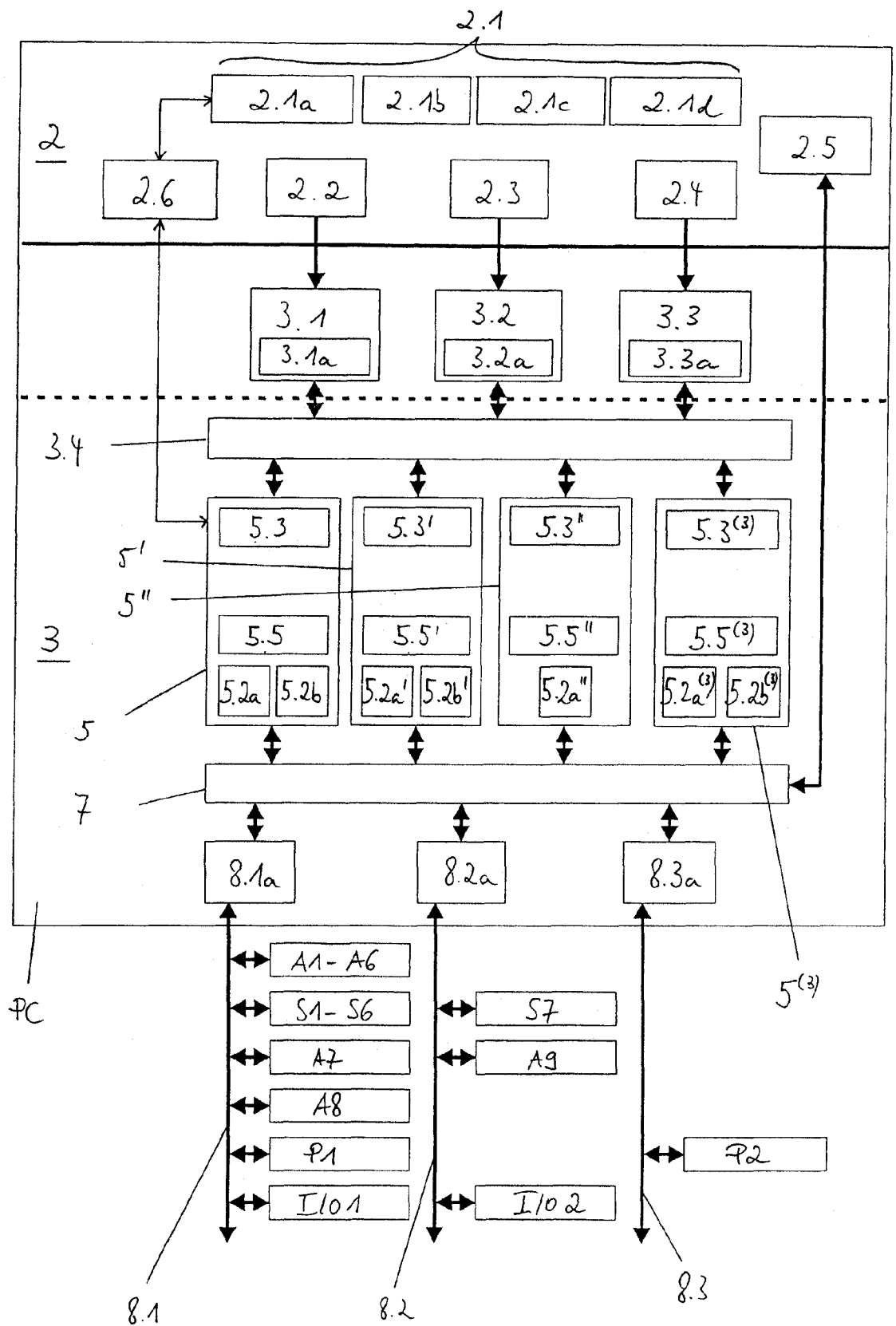
FIG. 4 is a more detailed representation of an inventive apparatus according to FIG. 1 and FIG. 2.

FIG. 4 shows in detail the control architecture of a PC control for controlling a complex plant with once again a non-real timable part 2 and a real timable part 3, which manage several mutually independent machine controls 3.1, 3.2, 3.3 and by means of different drivers and bus systems it is possible for a plurality of different operational units, such as drives, sensors, input and output equipment and peripherals to respond.

The operating devices 2.1 shown in FIG. 1 are arranged in FIG. 2 in programming tools 2.1a, diagnostic tools 2.1d, control software 2.1c and human-machine interfaces (HMIs) for control purposes 2.1d. The non-real timable part 2 of the PC control incorporates a driver 2.5, e.g. a Windows driver, whose function will be explained hereinafter. By means of a program data router 3.4, the program data generated in the interpolating devices 3.1a, 3.2a, 3.3a of the machine controls 3.1, 3.2, 3.3 are passed to the above-described motion manager or the further, correspondingly constructed manager devices for sensors (sensor manager 5'), input and output equipment (I/O manager 5") and additional peripherals (peripherals manager $5^{(3)}$). These supply corresponding driver informations across bus data routers 7 to a plurality of buses 8.1, 8.2, 8.3, which in each case have their own driver 8.1a, 8.2a, 8.3a. To the buses 8.1-8.3 are, as already stated, connected operational units 6 of the plant to be controlled (cf. reference 6.1x, 6.2x in FIGS. 1 and 2), e.g. drives A1 to A6, sensors S1 to S6, drive A7, drive A8, peripherals P1, input/output equipment I/O1, sensor S7, drive A9, input/output equipment I/O2 and peripherals P2. The peripherals are constituted by mirror motors for galvanometers (for the deflection of laser units) or small, rapid drive axes. It is also possible to implement rapid inputs via a rapid real time driver, which buffers positions on an axis which are not in the same drive string. The manager devices 5, 5', 5", $5^{(3)}$ contain corresponding drivers 5.2a, 5.2b, 5.2a', 5.2b', 5.2a", $5.2a^{(3)}$, $5.2b^{(3)}$. Driver 2.5 is used for controlling the bus data router 7. The driver 2.5 also takes over the message provision of data from the interface under the interpolators. The interpolators supply their real time diagnostic data via the corresponding control to the non-real timable environment, e.g. a Windows environment. The drive data of the axes are directly made available for diagnostic purposes via the Windows driver 2.5 of Windows plane 2. Thus, all the data from the drive string which can be interrogated or polled in non-real timable manner in the Windows world, are made available by said "message interface".

Using the apparatus or method according to the invention it is consequently easily and efficiently possible to e.g. operate three axes of a six-axis industrial robot (RC) via the DSE drivers shown in FIG. 1 and FIG. 2, two further robot axes via an Ethernet driver and the sixth robot axis via Ethercat (Ethernet for Control Automation Technology). It is also possible in this way and in parallel to the described RC world, to control the CNC world with associated axes 1 to 20 of synchronous or asynchronous servomotors via Sercos drivers and axes 21 to 24 via Ethernet drivers. In addition, the Soft SPC can control associated axes 1 to 8 via the DSE driver and further axes 9 to 12 via Sercos drivers. Prior to the initial use, such a configuration must be manually configured by means of the motion manager 5, e.g. using the operating device 2.1, 5.1 shown.

The aforementioned tasks of the motion manager 5 are characterized as follows:

a) Initializing

The motion manager 5 can be looked upon as a control base. The centralized system services and settings are initialized during its booting process.

b) Smallest Basic Clock (Tick)

The system basic clock is configured in as via motion manager 5. The clock source can be an external interrupt (e.g. SERCOS board). All other clocks in the system must be integral multiples of the basic system clock $t_{Tick}$.

c) Configuration Data Bank

The motion manager 5 initially loads all the configured axis drivers. Then each axis driver applies axis objects for its configured axes. Following the axis drivers, the motion manager 5 loads the interpolators in the lower intermediate interpolation layer 5.5 and initializes them. The association of the axes with the interpolators can take place for the first time during the initialization thereof and can be reconfigured to the running time.

d) Cyclic Monitoring

The motion manager 5 synchronizes the starting of the different modules (axis drivers/interpolators) by means of a state machine and monitors the interpolators cyclically.

e) Parameterization

The motion manager 5 associates logic axes with an interpolator. For axis groups (coupled axes) configuration can take place in such a way that these axes can only be associated in groups with an interpolator.

f) Diagnostic Functions (Trace)

The axis drivers receive an interface by means of which a trace configuration can be read in and a trace can be started, stopped or triggered. The configuration and data storage are axis driver-specific. Synchronous tracing via several axis drivers is impossible.

g) Measuring

The functionality of rapid measurement, conveyor (driveless axis) and so-called touch sense must be synchronized with the interpolators in a separate functionality.

h) State Management

The motion manager 5 manages the states of the brakes and controller releases. For this purpose the interpolators must set up jobs for controller and brake release. The motion manager ensures a consistency check. Axes sticking in the same brake channel may optionally be set "in control" by the motion manager 5.

i) Motion

The following motion types are to be synchronized:
cyclic data (desired values)
    position
    speed precontrol
    moment precontrol
cyclic data (actual values)
    position
    speed
    current (moment)
non-cyclic data
    controller release
    brake release
    parameter set selection
    monitoring limits.

It is possible with the aid of the present invention to mix or synchronize position values of the robot world, e.g. a position of the tool tip (TCP: Tool Centre Point) with movements of the CNC or PLC world. For example, a robot TCP given in Cartesian coordinates with all the time-relevant control signals can be made available via the motion manager to the CNC or Soft SPC world without time delays in the cycle of the interpolators. However, it is correspondingly possible to make available the individual or multiple axis signals of the CNC or SPC world to the robot interpolator. Such mixing of the different motion worlds leads to a significant simplification of plant programming, e.g. via the HMI world.

It is also possible to modify all at once the interpolation clocks for all the motion worlds. In this way a few axes can be operated with precise path planning and very short interpolation cycle or by docking it is possible to adapt with respect to a movement requirement further interpolator axes. According to the invention, the following scenario is possible: Following the connection of e.g. several SERCOS drives, the drive controller of a specific drive, via the specific driver through the intermediate interpolator at the motion manager indicates that a 125 ms clock is possible as timing on the driving bus over a drive string. Only the motion manager knows the overall plant and is able to control via a state machine whether the lower intermediate interpolation layer can be reconfigured in such a way that said cycle via the motion manager and corresponding interpolator is or is not possible (system utilization at e.g. 100 axes). For this purpose the motion manager is aware of the system load, so that it is possible here to implement an automation (switching up of intermediate interpolators).

In this connection it is also possible to couple and uncouple or transfer individual axes to a different motion core, e.g. as a result of Ethercat use. This makes things much easier for the operator during an automated reorganization of a plant or in the case of a fault. When using the inventive apparatus or method it is easily possible to synchronize in or out, e.g. a TCP or tool transfer, within a plant, with respect to a robot in the CNC world or for SPC belt advance.

With the aid of the inventive method or apparatus a movement control is also possible in the case of cooperating robots and/or plants.

While specific embodiments of the invention have been shown and described in detail to illustrate the application of the principles of the invention, it will be understood that the invention may be embodied otherwise without departing from such principles.

The invention claimed is:

1. A method for operating cooperating, differing devices, particularly of a plant with different controls, the method comprising:
controlling the differing devices through control sequences and in particular with different control clocks, wherein the clocks of the different controls are interpolated on a common system clock and the control sequences are synchronized in at least one synchronizing device, wherein through the operational units a modified system clock is proposed to a coordinating device, said coordinating device accepting or refusing the modified system clock.

2. A method according to claim 1, wherein operational units of the plant are provided with control signals after synchronization following a further interpolation.

3. A method according to claim 1, wherein the different control clocks of the different controls are selected according to a relationship $$IPO_i = n_i \cdot t_{Tick}, n_i = 1, 2, 3, \ldots$$

in which $t_{Tick}$ is an integral multiple of a clock of hardware used for performing the method.

4. A method according to claim 1, wherein the interpolation takes place on a common system clock in a common interpolating device for a control.

5. A method according to claim 1, wherein the axes of the devices are coordinated.

6. A method according to claim 1, wherein synchronization and/or coordination is performed in real time.

7. A method according to claim 1, wherein for the modified system clock the following applies:

$$t_{Tick}' = 1/n' \cdot t_{Tick}, n' = 1, 2, 3, \ldots$$

8. A method according to claim 1, wherein following the clock change, a plurality of functional units continue to be operated according to the old system clock.

9. A method according to claim 1, wherein in each case a plurality of devices of a specific device type is operated.

10. An apparatus for operating cooperating, differing devices, particularly of a plant, with different controls controlling the differing devices through control sequences, particularly with different control clocks, the apparatus comprising:
at least one common interpolating device for the controls for interpolating the clocks of the different controls on a common system clock and at least one synchronizing device for synchronizing the control sequences, wherein the synchronizing and/or coordinating device is constructed for modifying the system clock on request by at least one operational unit and for the modified system clock the following applies:

$$t_{Tick}' = 1/n' \cdot t_{Tick}, n' = 1, 2, 3, \ldots$$

11. An apparatus according to claim 10, wherein at least one further interpolating device for interpolating control signals for operational units of the devices following synchronization is included.

12. An apparatus according to claim 10, wherein a coordinating device for coordinating the control sequences is included.

13. An apparatus according to claim 10, wherein the synchronizing and/or coordinating devices are real timable.

14. An apparatus according to claim 10, wherein a non-real timable component for modifying the settings of the synchronizing and/or coordinating device is included.

15. An apparatus according to claim 10, wherein at least the synchronizing and/or coordinating device and a plurality of controls are constructed as programming devices implementable on a common computer unit.

16. An apparatus according to claim 10, wherein further devices can be connected during operation.

17. An apparatus according to claim 10, wherein the common interpolating device is constructed for the interpolation of control clocks in the form $$IPO_i = n_i \cdot t_{Tick}, n_i = 1, 2, 3, \ldots$$

in which $t_{Tick}$ is an integral multiple of a clock of hardware used.

18. An apparatus according to claim 10, wherein the synchronizing and/or coordinating device has an evaluating device for evaluating the system load and its result is vital for the modification of the system clock.

* * * * *